(12) United States Patent
Nagakura et al.

(10) Patent No.: US 10,286,789 B2
(45) Date of Patent: May 14, 2019

(54) SECONDARY BATTERY CHARGING SYSTEM WITH ALLOWABLE VOLTAGE ZONE AND METHOD THEREOF

(71) Applicant: Nissan Motor Co., Ltd., Yokohama-shi, Kanagawa (JP)

(72) Inventors: Hayato Nagakura, Kanagawa (JP); Kenichi Sakai, Kanagawa (JP); Kenji Hosaka, Kanagawa (JP); Kazuma Tamai, Kanagawa (JP); Hiroto Okabe, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 19 days.

(21) Appl. No.: 15/506,831

(22) PCT Filed: Aug. 29, 2014

(86) PCT No.: PCT/JP2014/072840
§ 371 (c)(1),
(2) Date: Feb. 27, 2017

(87) PCT Pub. No.: WO2016/031075
PCT Pub. Date: Mar. 3, 2016

(65) Prior Publication Data
US 2017/0274784 A1    Sep. 28, 2017

(51) Int. Cl.
*H02J 7/00* (2006.01)
*B60L 11/18* (2006.01)
(Continued)

(52) U.S. Cl.
CPC ......... *B60L 11/1812* (2013.01); *B60L 3/0046* (2013.01); *B60L 53/22* (2019.02);
(Continued)

(58) Field of Classification Search
None
See application file for complete search history.

(56) References Cited

U.S. PATENT DOCUMENTS 5,576,608 A    11/1996   Nagai et al.
5,637,981 A    6/1997    Nagai et al.
(Continued)

FOREIGN PATENT DOCUMENTS

JP    H05304730 A    11/1993
JP    H06325795 A    11/1994
(Continued)

*Primary Examiner* — David V Henze-Gongola
(74) *Attorney, Agent, or Firm* — Young Basile Hanlon & MacFarlane, P.C.

(57) ABSTRACT

A secondary battery charger system in which a chargeable power is calculated on the basis of a difference between a charging target voltage and a cell voltage using a charging control unit that controls a charger used to charge a secondary battery, the secondary battery charger system including a charging threshold voltage setting unit configured to set the charging target voltage to be lower than a charging limitation voltage which is an upper limitation of the cell voltage allowable in design. The charging control unit stops the charging if a predetermined charging stop condition is satisfied while the cell voltage exceeds the charging target voltage and is lower than the charging limitation voltage.

9 Claims, 8 Drawing Sheets

(51) Int. Cl.
  *H02J 7/04* (2006.01)
  *B60L 3/00* (2019.01)
  *H01M 10/44* (2006.01)
  *H02M 3/335* (2006.01)
  *B60L 53/22* (2019.01)
  *B60L 58/10* (2019.01)
  *B60L 58/13* (2019.01)

(52) U.S. Cl.
  CPC ............... *B60L 58/10* (2019.02); *B60L 58/13* (2019.02); *H01M 10/44* (2013.01); *H02J 7/00* (2013.01); *H02J 7/0029* (2013.01); *H02J 7/04* (2013.01); *H02M 3/33569* (2013.01); *H02J 7/045* (2013.01); *H02J 2007/0037* (2013.01)

(56) References Cited

U.S. PATENT DOCUMENTS

| | | |
|---|---|---|
| 5,739,671 A | 4/1998 | Hamada |
| 9,525,299 B2 | 12/2016 | Takano et al. |
| 2011/0204850 A1* | 8/2011 | Kaino .................. H02J 7/0029 320/116 |
| 2015/0054449 A1 | 2/2015 | Takano et al. |

FOREIGN PATENT DOCUMENTS

| | | |
|---|---|---|
| JP | H07115733 A | 5/1995 |
| JP | H08317572 A | 11/1996 |
| JP | 2000223161 A | 8/2000 |
| JP | 2013192348 A | 9/2013 |
| JP | 2014075256 A | 4/2014 |
| WO | 2013137142 A1 | 9/2013 |

\* cited by examiner

SECONDARY BATTERY CHARGING SYSTEM WITH ALLOWABLE VOLTAGE ZONE AND METHOD THEREOF

TECHNICAL FIELD

The present invention relates to a secondary battery charger system and a method of charging the same.

BACKGROUND

Various secondary batteries such as a lithium ion secondary battery are employed as a secondary battery of a so-called electrically-driven vehicle such as an electric vehicle or a hybrid vehicle. Such a secondary battery is charged, for example, using a quick battery charger or the like.

For example, a charger for charging a secondary battery is discussed in JP 2013-192348 A, in which a chargeable power is calculated on the basis of a charging target voltage and a measurement voltage of the secondary battery, and control is performed such that the output of the charger reaches the chargeable power. In this charger, its output may become higher than the chargeable power, and the voltage of the secondary battery significantly exceeds the target voltage, for example, if an abnormal situation occurs in the charger. This may deteriorate the secondary battery.

In this regard, for example, as discussed in JP 2014-75256 A, in order to prevent the charging voltage from significantly exceeding the target voltage, it is conceived that the charging power charged to the secondary battery from the charger may be restricted to a sufficiently low value when the cell voltage becomes higher than the target voltage (for example, the charging current may be restricted to zero by electrically disconnecting the charger and the secondary battery).

SUMMARY

However, in the charger system discussed in JP 2014-75256 A, a response of the charger may be delayed against a current control instruction issued from the controller that controls a charging operation to the charger. In this case, the cell voltage may temporarily exceed the charging target voltage.

If the voltage of the secondary battery temporarily exceeds the charging target voltage in this manner, the charging power is restricted even when the secondary battery does not reach an overcharging state. In particular, if the charging current is restricted to zero even when there is no worry about overcharging, it is difficult to obtain a sufficient charging amount.

In view of the aforementioned problems, it is therefore an object of the present invention to provide a secondary battery charger system capable of preventing excessive restriction on the charging amount while avoiding overcharging, and a method of charging the same.

According to one aspect of the present invention, a secondary battery charger system in which a chargeable power is calculated on the basis of a difference between a charging target voltage and a cell voltage using a charging control unit that controls a charger used to charge a secondary battery is provided. The secondary battery charger system includes a charging threshold voltage setting unit configured to set the charging target voltage to be lower than a charging limitation voltage which is an upper limitation of the cell voltage allowable in design. The charging control unit stops the charging if a predetermined charging stop condition is satisfied while the cell voltage exceeds the charging target voltage and is lower than the charging limitation voltage.

BRIEF DESCRIPTION OF THE EMBODIMENTS

Embodiments of the present invention will now be described with reference to the accompanying drawings.

First Embodiment

Figure 1:
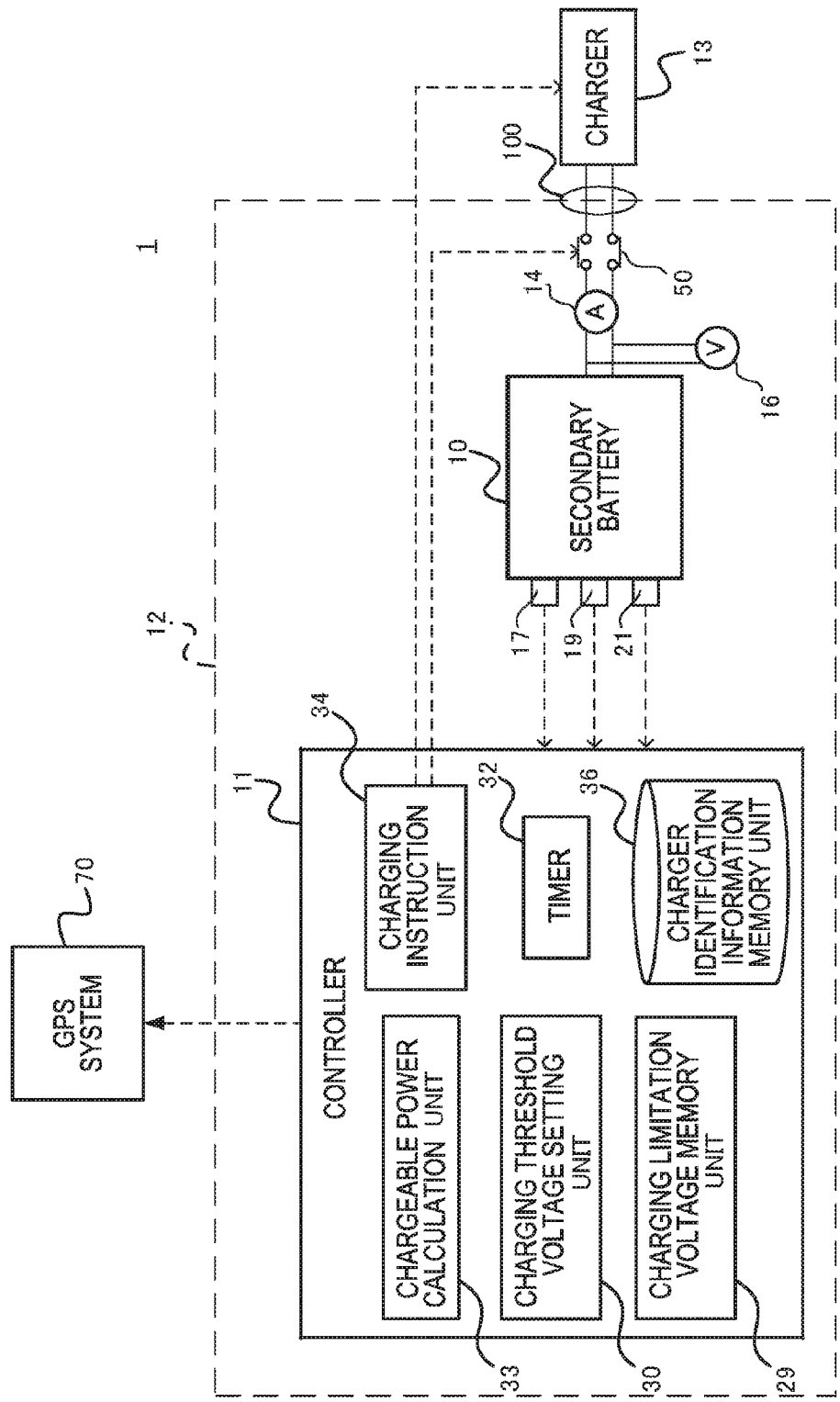
FIG. 1 is a block diagram illustrating a secondary battery charger system according to the present invention.

FIG. 1 is a block diagram illustrating a secondary battery charger system according to a first embodiment of the invention.

The secondary battery charger system 1 according to the first embodiment of the invention is used to charge a secondary battery 10, for example, installed in an electrically-driven vehicle. Note that the electrically-driven vehicle herein refers to a vehicle equipped with an electric motor driven by power of the secondary battery 10 as a driving power source, such as an electric vehicle that travels using an electric motor or a hybrid vehicle that travels using either an electric motor or an internal combustion engine.

The secondary battery charger system 1 has a battery housing 12 that houses the secondary battery 10 and a controller 11 and a charger 13 that charges the secondary battery 10 through a quick-charge (QC) port 100 of the battery housing 12.

The battery housing 12 includes an electric current sensor 14 configured to detect a charging current supplied from the charger 13 to the secondary battery 10, a voltage sensor 16 configured to detect a cell voltage of the secondary battery 10, a temperature sensor 17 configured to measure a temperature of the secondary battery 10, a state-of-charge (SOC) detection sensor 19 configured to measure a charging rate of the secondary battery 10, and a wear level detection sensor 21 configured to measure a wear level of the secondary battery 10. In addition, a relay 50 configured to switch a connection/disconnection state is provided between the secondary battery 10 and the charger 13. Note that a method of detecting the wear level of the secondary battery 10 using the wear level detection sensor 21 is not particularly limited, and any one of various techniques known in the art to detect the wear level of the secondary battery 10 may be employed. For example, the wear level of the secondary battery 10 may be detected by measuring charging and discharging currents and the cell voltage several times and analyzing a change of the voltage against a change of the detected current.

The secondary battery 10 may include, for example, a lithium ion secondary battery or a nickel hydrogen rechargeable battery. According to the first embodiment, the secondary battery 10 is a lithium ion secondary battery.

The controller 11 is a microcomputer provided with a central processing unit (CPU), a read-only memory (ROM), a random access memory (RAM), and an input/output (I/O) interface. Note that each unit of the controller 11 described below is implemented using these elements such as the CPU, the ROM, the RAM, and the I/O interface.

The charging controller 11 includes a charging limitation voltage memory unit 29, a charging threshold voltage setting unit 30, a timer 32, a chargeable power calculation unit 33, a charging instruction unit 34, and a charger information recording unit 36.

The charger 13 is a so-called quick battery charger configured to supply charging power (DC current) to the secondary battery 10 in response to an instruction from the controller 11 and is provided with a charging gun (not shown). As the charging gun is inserted into the QC port 100 of the battery housing 12, the secondary battery 10 has a chargeable state.

The charging limitation voltage memory unit 29 stores a charging limitation voltage as a predetermined upper-limit voltage allowable in design for the secondary battery 10 according to the first embodiment. Note that the upper-limit voltage allowable in design is set appropriately depending on materials of positive and negative electrodes and electrolyte of the secondary battery 10 or the like and serves as a threshold for determining whether or not overcharging occurs. If the secondary battery 10 is, for example, a lithium ion secondary battery, typically, when the cell voltage reaches an over-voltage state (exceeding a lithium extraction voltage), irreversible wear abruptly progresses due to extraction of lithium, and this reduces a design service life of the battery. The upper-limit voltage is set to a limitation value within which performance allowed in design is satisfied. Therefore, the upper-limit voltage is set to be higher than a charging target voltage described below.

The charging threshold voltage setting unit 30 sets the charging target voltage on the basis of the value of the charging limitation voltage stored in the charging limitation voltage memory unit 29 and the detection values of the electric current sensor 14, the voltage sensor 16, the temperature sensor 17, the SOC detection sensor 19, and the wear level detection sensor 21 described above. The charging target voltage is a maximum value of the cell voltage serving as a target in a charging operation. Therefore, when the cell voltage reaches the charging target voltage, the charging control (for constant-voltage charging) is performed not to raise the cell voltage thereover.

The timer 32 serves as a time measurement unit for measuring the time for maintaining a state in which the cell voltage exceeds the charging target voltage and is lower than the charging limitation voltage on the basis of the value of the charging limitation voltage described above, the detection value of the voltage sensor 16, and the charging target voltage set by the charging threshold voltage setting unit 30.

The chargeable power calculation unit 33 reads the value of the charging target voltage and the detection value of the voltage sensor 16 and calculates a chargeable power on the basis of a difference between the charging target voltage and the measurement value of the cell voltage. In addition, according to the first embodiment, a difference between the measurement value of the cell voltage and the charging limitation voltage is also calculated and is output to the charging instruction unit 34.

The charging instruction unit 34 transmits a charging power instruction based on the chargeable power calculated by the chargeable power calculation unit 33 to the charger 13. In particular, according to the first embodiment, a measurement time is received from the timer 32, and a charging stop process is performed if it is determined that the received measurement time reaches a predetermined time. The charging stop process is a process of instructing to shut down the relay 50 in accordance with a typical shutdown sequence.

Specifically, in the charging stop process, a charging stop flag is set in a shutdown control unit (not shown) of the charging instruction unit 34. On the basis of the charging stop flag, the shutdown control unit starts the shutdown sequence, and the relay 50 is shut down after completing the shutdown sequence. Note that a typical shutdown sequence is a process of transmitting a charging stop instruction (an instruction for setting the charging power to zero) from the charging instruction unit 34 to the charger 13 depending on the charging stop flag set in the shutdown control unit and then detecting a state in which an actual charging current (charging power) supplied to the secondary battery 10 reaches nearly zero on the basis of the current detected by the electric current sensor 14.

The charging instruction unit 34 reads the charging limitation voltage from the charging limitation voltage memory unit 29 and determines whether or not the cell voltage measured by the voltage sensor 16 is higher than the charging limitation voltage. If it is determined that the cell voltage is higher than the charging limitation voltage, an emergency stop process for instructing forced shutdown of the relay 50 is performed.

Here, in the emergency stop process, a typical shutdown sequence is skipped, and the relay 50 is forcedly shut down with a higher priority to the disconnection between the charger 13 and the secondary battery 10.

The SOC detection sensor 19 estimates the state of charge (SOC) from the cell voltage detected by the voltage sensor 16 and an integrated value of the charging current (integrated current) detected by the electric current sensor 14 using a method known in the art even during the charging operation of the charger 13. The method of calculating the SOC is known in the art and will not be described herein. For example, the SOC can be obtained by detecting a remaining capacity of the secondary battery 10 from an open voltage of the secondary battery 10 at the time of the start of charging or discharging and adding or subtracting a change of the remaining capacity depending on the integrated value of the charging current from the start of the charging to or from the remaining capacity at the time of the start of charging or discharging.

Figure 2:
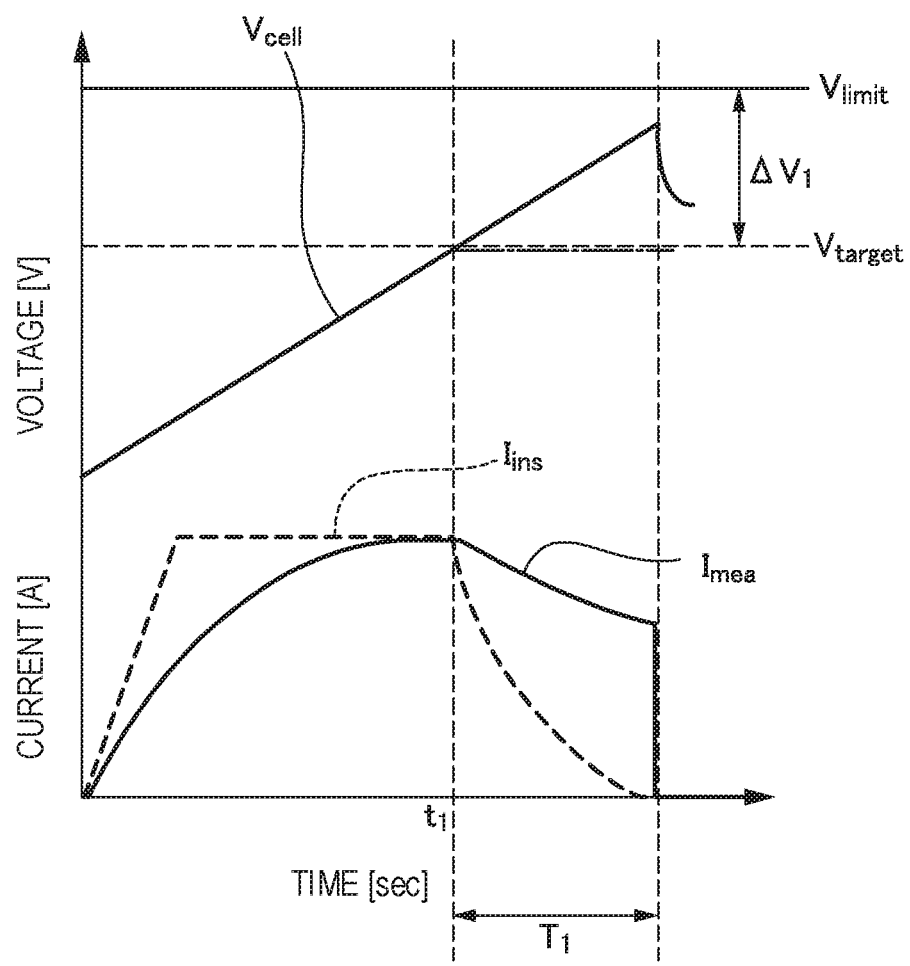
FIG. 2 is a diagram illustrating a charging control operation according to a first embodiment of the invention.

FIG. 2 is a diagram illustrating a charging control operation according to the first embodiment. FIG. 2 shows a change of the cell voltage $V_{cell}$ measured by the voltage sensor 16 depending on a charging time [sec], a charging current instruction value $I_{ins}$ output from the charging instruction unit 34 to the charger 13 of FIG. 1, and a measurement charging current $I_{mea}$ (response current) actually measured by the electric current sensor 14 in response to the charging current instruction value $I_{ins}$. Here, "$V_{limit}$" denotes the charging limitation voltage, and "$V_{target}$" denotes the charging target voltage.

The charging target voltage $V_{target}$ represents a value of the cell voltage used as a target voltage to complete the charging operation. According to the first embodiment, the charging target voltage $V_{target}$ is set by the charging target setting unit 30 on the basis of the measurement charging current $I_{mea}$ measured by the electric current sensor 14, the cell temperature measured by the temperature sensor 17, the value of the SOC measured by the SOC detection sensor 19, and the value of the wear level detected by the wear level detection sensor 21.

More specifically, the charging target voltage $V_{target}$ is a safe value (low value) determined by considering these values and set to prevent the cell voltage $V_{cell}$ from reaching the charging limitation voltage $V_{limit}$ during a predetermined time $T_1$. In addition, the charging target voltage $V_{target}$ is set such that a capacity can be obtained not to harm battery functionality of the secondary battery 10. Note that, if safety is considered on the top priority, the charging target voltage $V_{target}$ is preferably set to the minimum value lower than the charging limitation voltage $V_{limit}$ considering the measurement charging current $I_{mea}$, the cell temperature, the SOC, and the wear level described above.

As illustrated in FIG. 2, in the charging control operation, the charging current instruction value $I_{ins}$ is abruptly raised to a certain level from the start of the charging and is then maintained at this constant-current charging state for a predetermined time. In this case, the cell voltage $V_{cell}$ linearly increases against the charging time depending on an I-V characteristic of the battery cell.

At the timing $t_1$ in which the cell voltage $V_{cell}$ reaches the charging target voltage $V_{target}$, the chargeable power calculation unit 33 determines that the chargeable power is zero, and the charging instruction unit 34 outputs the charging current as the instruction value $I_{ins}$ to the charger 13 in order to constantly maintain the cell voltage $V_{cell}$ at the charging target voltage $V_{target}$ (constant voltage charging).

However, as recognized from the change of the measurement charging current $I_{mea}$ of FIG. 2, a response delay occurs depending on a response characteristic of the charger 13, in which a change of the measurement charging current $I_{mea}$ actually flowing to the secondary battery 10 in response to the charging current instruction value $I_{ins}$ is delayed. Therefore, an unexpected higher measurement charging current $I_{mea}$ flows.

In this manner, if a response delay occurs, and an unexpected higher measurement charging current $I_{mea}$ flows, the cell voltage $V_{cell}$ may not match an ideal constant-voltage state indicated by the one-dotted chain line after the timing $t_1$ as illustrated in FIG. 2, but may exceed the charging target voltage $V_{target}$. However, in the secondary battery charger system 1 according to the first embodiment, control is performed such that the charging is continuously performed if the cell voltage $V_{cell}$ does not finally reach the charging limitation voltage $V_{limit}$ even when the cell voltage $V_{cell}$ slightly exceeds the charging target voltage $V_{target}$.

Meanwhile, if the time for which the cell voltage $V_{cell}$ exceeds the charging target voltage $V_{target}$ and is lower than the charging limitation voltage $V_{limit}$ (hereinafter, referred to as an allowable voltage zone "$\Delta V_1$") due to the response delay reaches the predetermined time $T_1$, the charging instruction unit 34 performs the charging stop process.

In this manner, the relay 50 is shut down through the charging stop process. Note that an insignificant time lag exists from the start of the charging stop process of the charging instruction unit 34 to the timing at which the measurement charging current $I_{mea}$ becomes zero in practice. However, since this time lag is insignificant, it is recognized from FIG. 2 that the timing at which the information representing that the chargeable power is zero is output (that is, when the predetermined time T1 elapses) and the timing at which the measurement charging current $I_{mea}$ becomes zero are nearly simultaneous.

Figure 3:
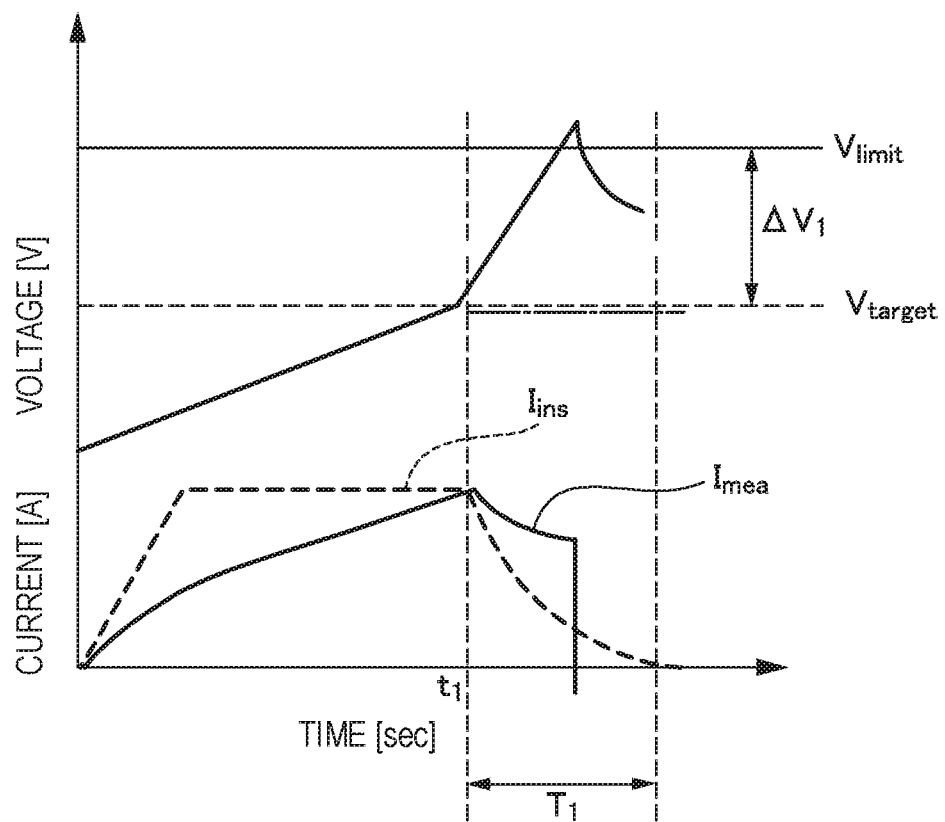
FIG. 3 is a diagram illustrating the charging control operation according to the first embodiment of the invention.

FIG. 3 shows a case where the response characteristic of the charger 13 is worse under the charging target voltage $V_{target}$ and the charging limitation voltage $V_{limit}$ of FIG. 2. In this case, followability of a change (drop) of the measurement charging current $I_{mea}$ against a change of the charging current instruction value $I_{ins}$ is worse, and the cell voltage $V_{cell}$ exceeds the charging limitation voltage $V_{limit}$ as well as the charging target voltage $V_{target}$.

In such a case, when the voltage sensor 16 detects that the cell voltage $V_{cell}$ reaches the charging limitation voltage $V_{limit}$, the charging instruction unit 34 performs an emergency stop process to forcedly shut down the relay 50. As a result, a typical shutdown sequence is skipped, and the secondary battery 10 and the charger 13 are forcedly disconnected even when the charging current flows.

That is, the charging limitation voltage $V_{limit}$ is a limitation of the voltage inhibited in design of the secondary battery 10. Therefore, if the supplied voltage exceeds the charging limitation voltage $V_{limit}$, the relay 50 is forcedly shut down in order to prevent overcharging with a top priority.

Once the cell voltage $V_{cell}$ exceeds the charging limitation voltage $V_{limit}$ as described above, the charger 13 has a bad response characteristic, and this charger 13 becomes unusable. For this reason, information on this charger 13 is stored in the charger information recording unit 36 of the controller 11. When the charging operation is performed again, the charging instruction unit 34 compares information on the charger 13 to be used in the charging operation with the information recorded in the charger information recording unit 36. If the information matches each other, the control is performed such that use of this charger 13 is inhibited. Note that the information on the charger may include, for example, a unique identifier for identifying the charger 13 or position information on the area where the charger 13 is placed.

Figure 4:
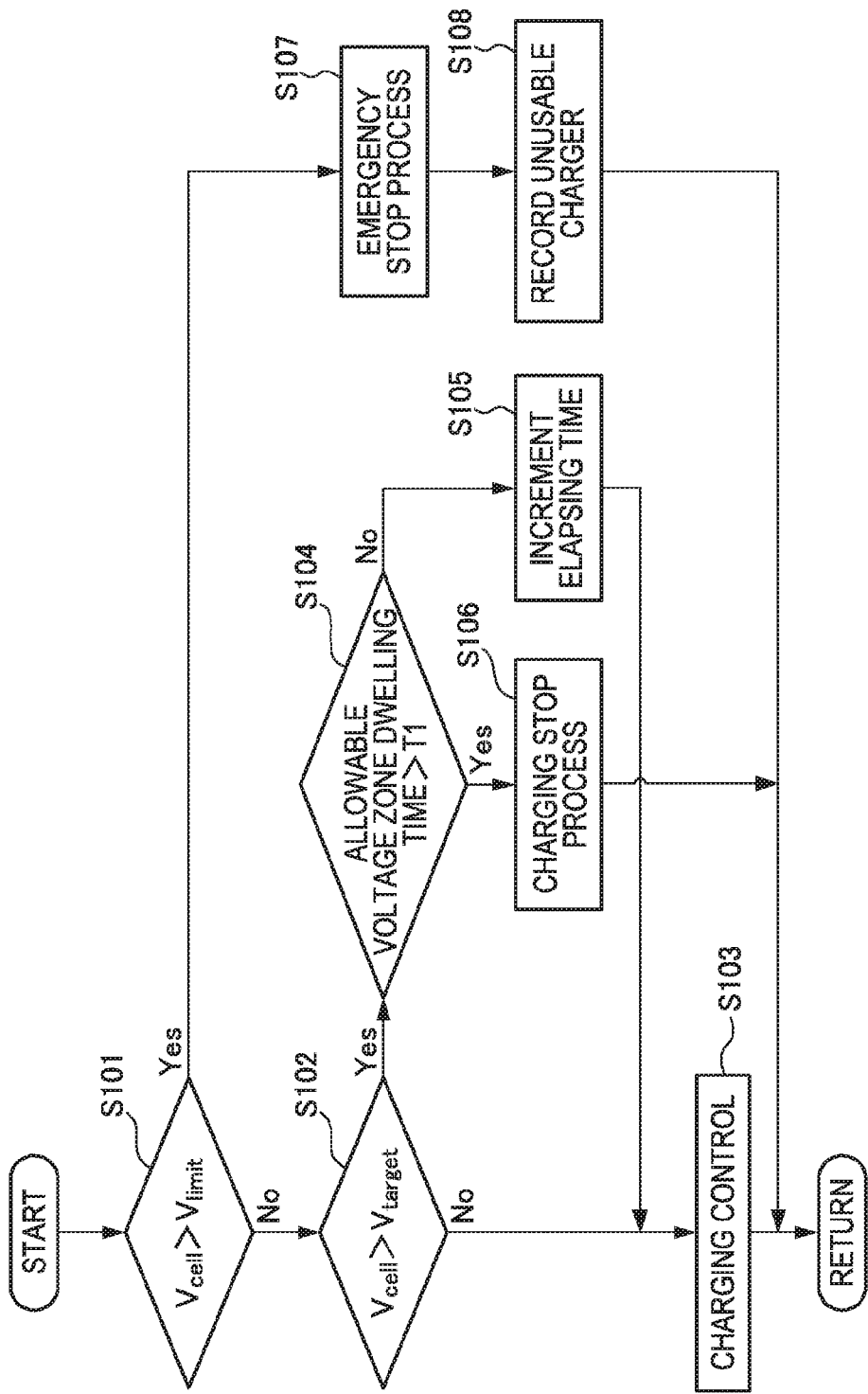
FIG. 4 is a flowchart illustrating a flow of the charging control operation according to the first embodiment of the invention.

FIG. 4 is a flowchart illustrating an actual flow for the charging control of FIGS. 2 and 3.

In step S101, the charging instruction unit 34 determines whether or not the cell voltage $V_{cell}$ is higher than the charging limitation voltage $V_{limit}$ on the basis of a result of calculation for the difference between the cell voltage $V_{cell}$ and the charging limitation voltage $V_{limit}$ using the chargeable power calculation unit 33. Here, if it is determined that the cell voltage $V_{cell}$ is lower than the charging limitation voltage $V_{limit}$, the process advances to step S102.

In step S102, the charging instruction unit 34 determines whether or not the cell voltage $V_{cell}$ is higher than the charging target voltage $V_{target}$ on the basis of a result of calculation for the difference between the cell voltage $V_{cell}$ and the charging target voltage $V_{target}$ using the chargeable power calculation unit 33. If it is determined that the cell voltage $V_{cell}$ is lower than the charging target voltage $V_{target}$, the process advances to step S103, so that a typical charging control operation using each element of the controller 11 is performed. Then, the process returns to step S101.

Meanwhile, if it is determined that the cell voltage $V_{cell}$ exceeds the charging target voltage $V_{target}$, the process advances to step S104.

In step S104, it is determined whether or not an allowable voltage zone dwelling time of the cell voltage $V_{cell}$ exceeds the predetermined time $T_1$ (first predetermined time) using the timer 32. If it is determined that the allowable voltage zone dwelling time of the cell voltage $V_{cell}$ does not exceed the predetermined time $T_1$, the process advances to step S105.

In step S105, the measurement time of the timer 32 is incremented. In addition, the process advances to the typical charging control operation of step S103 and then returns to step S101.

Otherwise, if it is determined in step S104 that the allowable voltage zone dwelling time of the cell voltage $V_{cell}$ exceeds the predetermined time $T_1$, the process advances to step S106.

In step S106, the charging instruction unit 34 performs the charging stop process of the typical shutdown sequence. As a result, the relay 50 is shut down, and the charging operation stops. Then, the cell voltage $V_{cell}$ does not increase and is prevented from reaching the charging limitation voltage $V_{limit}$.

Meanwhile, if it is determined in step S101 that the cell voltage $V_{cell}$ is higher than the charging limitation voltage $V_{limit}$, the process advances to step S107.

In step S107, the charging instruction unit 34 performs the emergency stop process by skipping the typical shutdown sequence. As a result, the relay 50 is forcedly shut down. Here, the shutdown of the relay 50 relating to the emergency stop process is forcedly performed even when the charging current flows. Accordingly, the relay 50 receives a lot of burdens, and its service life may be reduced due to sticking of the relay switch. Therefore, the emergency stop process is not to be performed frequently. According to the first embodiment, the emergency stop process is performed only when the cell voltage $V_{cell}$ exceeds the charging limitation voltage $V_{limit}$ serving as a design upper-limit value. Therefore, it is possible to guarantee safety in the charging operation and prevent the relay 50 from receiving a lot of burdens.

In step S108, the controller 11 records information on this charger 13 in the charger information recording unit 36 as a charger 13 prohibited in the next charging operation.

For example, the charging instruction unit 34 reads information on the charger 13 to be used in the next charging operation and compares this information with the information on the charger 13 recorded in the charger information recording unit 36. If the information matches each other as a result of the comparison, use of this charger 13 may be inhibited.

As a result, it is possible to prevent a charger having unsatisfactory followability due to the cell voltage $V_{cell}$ exceeding the charging limitation voltage $V_{limit}$ from being used again.

Using the secondary battery charger system 1 described above according to the first embodiment, it is possible to obtain the following functional effects.

The secondary battery charger system 1 according to the first embodiment calculates the chargeable power on the basis of the difference between the charging target voltage $V_{target}$ and the cell voltage $V_{cell}$ using the chargeable power calculation unit 33 as a charging control unit for controlling the charger 13 used to charge the secondary battery 10.

In addition, the secondary battery charger system 1 has the charging threshold voltage setting unit 30 configured to set the charging target voltage $V_{target}$ to be lower than the charging limitation voltage $V_{limit}$ serving as an upper limitation of the cell voltage $V_{cell}$ allowed in design of the secondary battery 10. In addition, the charging instruction unit 34 as a charging control unit stops the charging operation if a predetermined charging stop condition is satisfied while the cell voltage $V_{cell}$ exceeds the established charging target voltage $V_{target}$ and is lower than the charging limitation voltage $V_{limit}$ (that is, while it dwells in the allowable voltage zone $\Delta V_1$).

As a result, even when a response of the change of the measurement charging current $I_{mea}$ from the charger 13 against the charging current instruction value from the charging instruction unit 34 to the charger 13 is delayed, the charging stops first if the charging stop condition is satisfied while the cell voltage $V_{cell}$ is within the allowable voltage zone $\Delta V_1$, instead of limiting the charging current immediately after the cell voltage exceeds the charging target voltage $V_{target}$. Therefore, it is possible to reliably prevent overcharging generated when the cell voltage $V_{cell}$ exceeds the charging limitation voltage $V_{limit}$ so as to avoid battery deterioration and contribute to improvement of safety. In addition, it is possible to prevent the charging amount from being excessively restricted unlike the prior art.

In particular, the secondary battery charger system 1 according to the first embodiment has the timer 32 as a time measurement unit for measuring a time for which the cell voltage $V_{cell}$ exceeds the charging target voltage $V_{target}$ and is lower than the charging limitation voltage $V_{limit}$ (while the cell voltage $V_{cell}$ dwells in the allowable voltage zone $\Delta V_1$). In addition, the charging instruction unit 34 as a charging control unit stops the charging operation when the aforementioned predetermined charging stop condition is satisfied, that is, when the measurement time of the timer 32 reaches the predetermined time $T_1$ (refer to steps S104 and S106 of FIG. 4).

As a result, the time for which the cell voltage $V_{cell}$ dwells in the allowable voltage zone $\Delta V_1$ is measured, and the charging operation stops if this time reaches the predetermined time $T_1$ (for example, 10 seconds). Therefore, it is possible to prevent the charging operation from being continuously performed over the charging limitation voltage $V_{limit}$ notwithstanding that the cell voltage $V_{cell}$ exceeds the charging target voltage $V_{target}$. In addition, it is possible to reliably obtain the charging amount due to the charging operation performed for the predetermined time $T_1$.

According to the first embodiment, the charging instruction unit 34 forcedly shuts down the relay 50 connected between the secondary battery 10 and the charger 13 if the cell voltage $V_{cell}$ exceeds the charging limitation voltage $V_{limit}$ (refer to step S107 of FIG. 4). That is, the relay 50 is shut down through the emergency stop process described above. As a result, it is possible to more reliably prevent an overcharging state in which the cell voltage $V_{cell}$ exceeds the charging limitation voltage $V_{limit}$.

According to the first embodiment, if the relay 50 is forcedly shut down, the charging instruction unit 34 records the information on this charger 13 in the charger information recording unit 36 as an unusable charger 13 in the next charging operation.

As a result, it is possible to prevent use of the charger 13 having bad followability by which the cell voltage $V_{cell}$ exceeds the charging limitation voltage $V_{limit}$. Furthermore, this contributes to improvement of safety of the secondary battery 10.

Alternatively, the information on the charger 13 may include placement position information of the charger 13. Alternatively, the placement position information of the charger 13 may be reflected on position information of a GPS system 70 mounted to a power-consuming device or vehicle provided with the secondary battery 10.

As a result, if the secondary battery 10 is mounted to an automobile car such as an electric vehicle (EV) or a hybrid electric vehicle (HEV) as the power-consuming device or vehicle, GPS data of a navigation system mounted to the automobile car may contain position information of the charger having a bad response characteristic. Therefore, a driver of the automobile car may recognize the placement position of the charger having a bad response characteristic. Thus, it is possible to prevent a driver from erroneously visiting to a charging point having the unsatisfactory charger.

Second Embodiment

A second embodiment of the present invention will now be described. Note that like reference numerals denote like elements as in the first embodiment, and their description will not be repeated herein.

Figure 5:
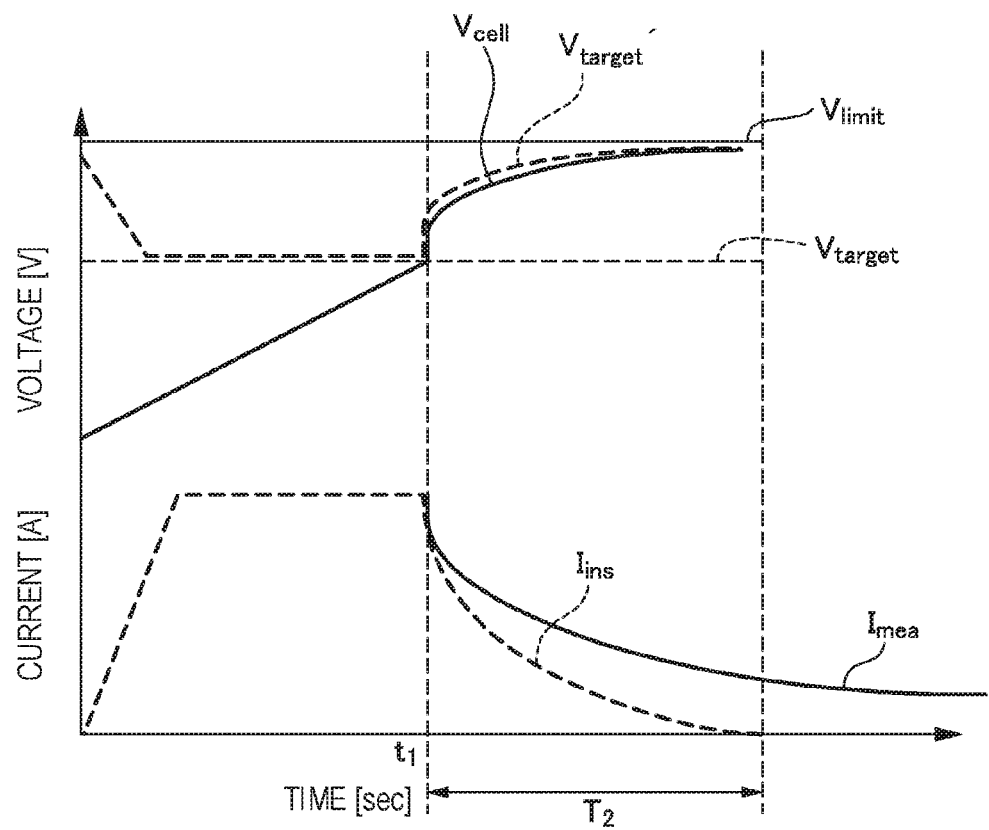
FIG. 5 is a diagram illustrating a charging control operation according to a second embodiment of the invention.

FIG. 5 is a diagram illustrating a charging control operation according to a second embodiment of the invention. As illustrated in FIG. 5, according to the second embodiment, the constant-current charging performed in the initial stage of the charging operation is terminated. That is, a variable charging target voltage $V_{target}'$ that changes depending on time after the timing $t_1$ at which the cell voltage $V_{cell}$ reaches the charging target voltage $V_{target}$ is set instead of the charging target voltage $V_{target}$. The variable charging target voltage $V_{target}'$ is set to a range between the charging target voltage $V_{target}$ and the charging limitation voltage $V_{limit}$.

Here, the variable charging target voltage $V_{target}'$ is determined by the charging target setting unit 30 on the basis of the measurement charging current $I_{mea}$, the cell temperature measured by the temperature sensor 17, the SOC measured by the SOC detection sensor 19, and the wear level detected by the wear level detection sensor 21 such that the cell voltage $V_{cell}$ is maintained to be lower than the charging limitation voltage $V_{limit}$ for a predetermined time $T_2$. Specifically, the variable charging target voltage $V_{target}'$ is set by estimating an increase amount of the cell voltage $V_{cell}$ from the charging target voltage $V_{target}$ for the predetermined time $T_2$ on the basis of these values and subtracting this increase amount from the charging limitation voltage $V_{limit}$.

As illustrated in FIG. 5, according to the second embodiment, after the end of the constant-current charging, that is, after the timing $t_1$, the measurement charging current $I_{mea}$ is still larger in the initial stage, and an increase amount of the cell voltage $V_{cell}$ per unit time caused by a diffusion resistance during charging increases. Therefore, an increase amount of the variable charging target voltage $V_{target}'$ per unit time in the initial stage is also set to be relatively large.

Meanwhile, in the end stage after the timing $t_1$ (immediately before the end of the predetermined time $T_2$), the measurement charging current $I_{mea}$ becomes relatively small, and the increase amount of the cell voltage $V_{cell}$ per unit time caused by a diffusion resistance during charging is reduced. Therefore, the increase amount of the variable charging target voltage $V_{target}'$ per unit time in the end stage is also set to be relatively small.

As described above, in the secondary battery charger system 1 according to the second embodiment, the charging threshold voltage setting unit 30 calculates the variable charging target voltage $V_{target}'$ as a charging target voltage on the basis of the temperature, the SOC, the charging current, and the wear level of the secondary battery 10. Specifically, the increase amount described above is estimated to be larger as the temperature of the secondary battery 10 decreases, the SOC decreases, the charging current increases, and the wear level increases. As a result, the variable charging target voltage $V_{target}'$ is calculated to be lower as the temperature of the secondary battery 10 decreases, the SOC decreases, the charging current increases, and the wear level increases.

That is, the variable charging target voltage $V_{target}'$ changes depending on changes of the temperature, the SOC, the charging current, and the wear level per unit time of the secondary battery 10. As a result, even when a response characteristic of the measurement charging current $I_{mea}$ against the charging current instruction value $I_{ins}$ is unsatisfactory, and the measurement charging current $I_{mea}$ is not immediately converged to the instruction value $I_{ins}$ as illustrated in FIG. 5, the variable charging target voltage $V_{target}'$ is set as a target. Therefore, it is possible to continuously perform the charging operation while the cell voltage $V_{cell}$ is lower than the charging limitation voltage $V_{limit}$. Accordingly, it is possible to obtain a larger charging amount.

According to the second embodiment, the variable charging target voltage $V_{target}'$ is calculated on the basis of the temperature, the SOC, the charging current, and the wear level of the secondary battery 10. Alternatively, the variable charging target voltage $V_{target}'$ may also be calculated on the basis of any one or more of these values.

Third Embodiment

A third embodiment of the present invention will now be described. Note that like reference numerals denote like elements as in the first embodiment, and their description will not be repeated herein.

Figure 6:
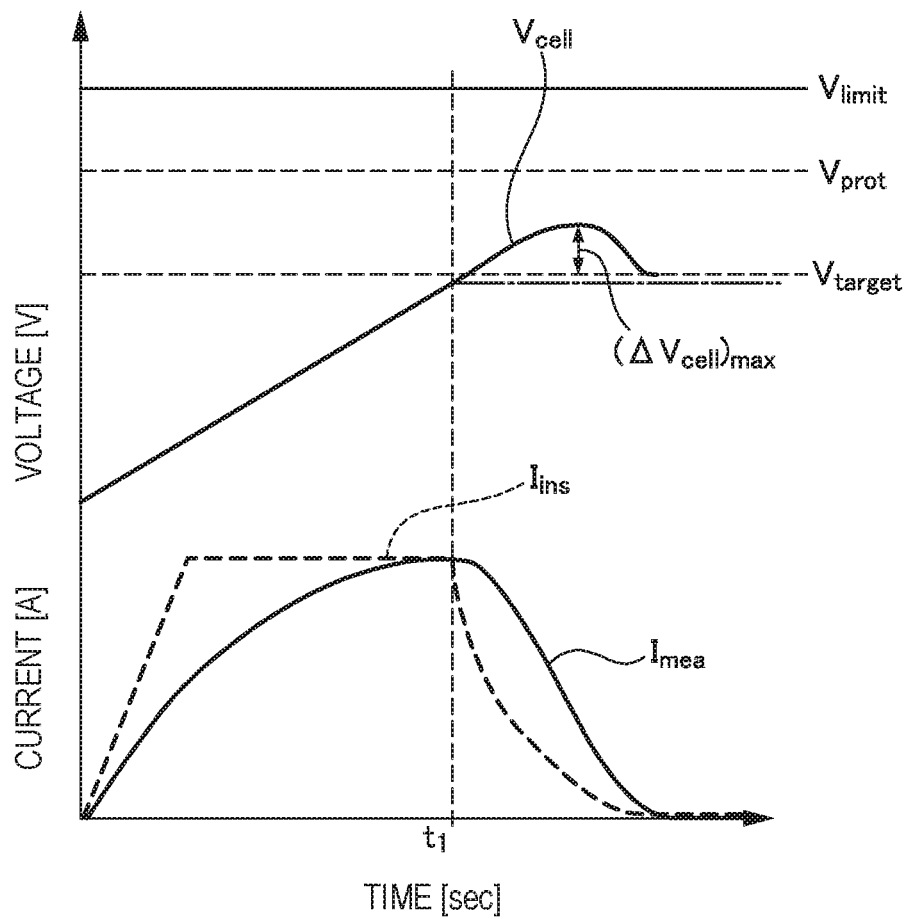
FIG. 6 is a diagram illustrating a charging control operation according to a third embodiment of the invention.

FIG. 6 is a diagram illustrating a charging control operation according to a third embodiment of the invention. According to the third embodiment, in particular, the charging target setting unit 30 sets a predetermined value of the protection voltage threshold $V_{prot}$ higher than the charging target voltage $V_{target}$ and lower than the charging limitation voltage $V_{limit}$.

Here, the protection voltage threshold $V_{prot}$ is set to be higher than the charging target voltage $V_{target}$. That is, even when the measurement charging current $I_{mea}$ of the charger 13 does not follow the instruction due to its unsatisfactory response characteristic after the cell voltage $V_{cell}$ reaches the charging target voltage $V_{target}$ and the charging instruction unit 34 issues an instruction for decreasing the charging current, the charging operation is continuously performed as long as the cell voltage $V_{cell}$ does not reach the protection voltage threshold $V_{prot}$ even when the cell voltage $V_{cell}$ exceeds the charging target voltage $V_{target}$.

According to the third embodiment, in particular, a followability level [A/sec], which is a response index representing how fast the measurement charging current $I_{mea}$ responses to a change of the charging current instruction value $I_{ins}$, is considered as a parameter of the charger 13. That is, assuming that the charger 13 has a certain allowable level of followability [A/sec] (for example, 10 A/sec or higher), a maximum increase amount $(\Delta V_{cell})_{max}$ of the cell voltage $V_{cell}$ from the charging target voltage $V_{target}$ is estimated by considering a response delay of the measurement charging current $I_{mea}$ at this followability level.

In addition, the protection voltage threshold $V_{prot}$ is set to be higher than a value obtained by adding the maximum value $(\Delta V_{cell})_{max}$ to the charging target voltage $V_{target}$.

Even when the cell voltage $V_{cell}$ exceeds the charging target voltage $V_{target}$, the charging operation is continuously performed as long as it does not exceed the protection voltage threshold $V_{prot}$. Therefore, the charging operation is continuously performed if the charger 13 has an allowable and desirable followability level or higher (here, set to 10 A/sec or higher).

Meanwhile, if the response characteristic of the charger 13 is worse than an estimated value (for example, lower than 10 A/sec), and the cell voltage $V_{cell}$ exceeds the protection voltage threshold $V_{prot}$, a charging stop process is performed.

Figure 7:
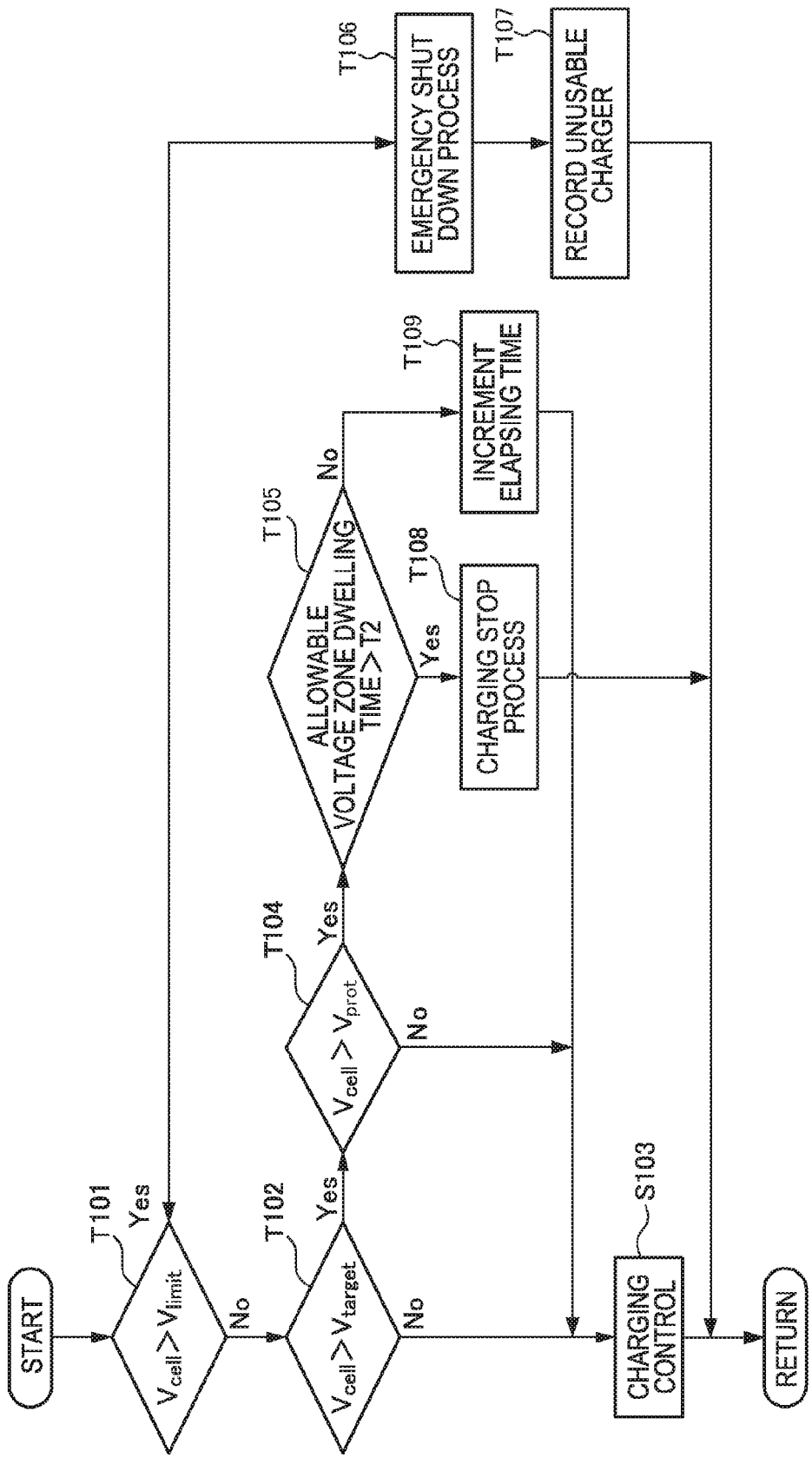
FIG. 7 is a flowchart illustrating a flow of the charging control operation according to the third embodiment of the invention.

FIG. 7 is a flowchart illustrating a flow of an actual charging control operation according to the third embodiment.

In step T101, the charging instruction unit 34 determines whether or not the cell voltage $V_{cell}$ is higher than the charging limitation voltage $V_{limit}$ on the basis of a result of the calculation of the chargeable power calculation unit 33 for the difference between the cell voltage $V_{cell}$ and the charging limitation voltage $V_{limit}$. Here, if it is determined that the cell voltage $V_{cell}$ is lower than the charging limitation voltage $V_{limit}$, the process advances to step T102.

In step T102, the charging instruction unit 34 determines whether or not the cell voltage $V_{cell}$ exceeds the charging target voltage $V_{target}$ on the basis of a result of the calculation of the chargeable power calculation unit 33 for the difference between the cell voltage $V_{cell}$ and the charging target voltage $V_{target}$. If it is determined that the cell voltage $V_{cell}$ is lower than the charging target voltage $V_{target}$, the process advances to step T103, and a typical charging control operation using each element of the controller 11 is continuously performed. Then, the process returns to step T101.

Otherwise, if it is determined that the cell voltage $V_{cell}$ exceeds the charging target voltage $V_{target}$, the process advances to step T104.

In step T104, the charging instruction unit 34 determines whether or not the cell voltage $V_{cell}$ exceeds the protection voltage threshold $V_{prot}$ on the basis of a result of the calculation of the chargeable power calculation unit 33 for the difference between the cell voltage $V_{cell}$ and the protection voltage threshold $V_{prot}$. If it is determined that the cell voltage $V_{cell}$ does not exceed the protection voltage threshold $V_{prot}$, that is, if it is determined that the cell voltage $V_{cell}$ is higher than the charging target voltage $V_{target}$ and is equal to or lower than the protection voltage threshold $V_{prot}$, the process advances to a typical charging control operation and then returns to step T103.

Meanwhile, if it is determined that the cell voltage $V_{cell}$ exceeds the protection voltage threshold $V_{prot}$ in step T104, the process advances to step T105. That is, if it is determined that the cell voltage $V_{cell}$ is higher than the protection voltage threshold $V_{prot}$ and is lower than the charging limitation voltage $V_{limit}$, the process advances to step T105. Here, according to the third embodiment, a voltage zone higher than the protection voltage threshold $V_{prot}$ and lower than the charging limitation voltage $V_{limit}$ is referred to as an "allowable voltage zone."

In step T105, it is determined whether or not an allowable voltage zone dwelling time of the cell voltage $V_{cell}$ is longer than a predetermined time $T_2$ (second predetermined time) using the timer 32. If it is determined that the allowable voltage zone dwelling time of the cell voltage $V_{cell}$ is not longer than the predetermined time $T_2$, the process advances to step T109. Here, the predetermined time $T_2$ is set to be shorter than the predetermined time $T_1$ of the first embodiment (for example, 5 seconds).

In step T109, the measurement time of the timer 32 is incremented, and the process advances to the typical charging control operation of step T103. Then, the process returns to step T101.

Otherwise, if it is determined in step T105 that the allowable voltage zone dwelling time of the cell voltage $V_{cell}$ is longer than the predetermined time $T_2$, the process advances to step T108.

In step T108, the charging instruction unit 34 performs a charging stop process. As a result, the relay 50 is shut down, and the charging operation stops. Therefore, the cell voltage $V_{cell}$ does not increase thereafter, and it is possible to prevent the cell voltage $V_{cell}$ from reaching the charging limitation voltage $V_{limit}$.

Otherwise, if it is determined in step T101 that the cell voltage $V_{cell}$ reaches the charging limitation voltage $V_{limit}$, the process advances to step T106.

In step T106, the charging instruction unit 34 performs an emergency stop process. As a result, the relay 50 is forcedly shut down.

In step T107, similar to step S108 of FIG. 4, information on the charger 13 is recorded in the charger information recording unit 36 as an unusable charger in the next charging operation.

As described above, according to the third embodiment, the charging threshold voltage setting unit 30 sets the protection voltage threshold $V_{prot}$ higher than the charging target voltage $V_{target}$ and lower than the charging limitation voltage $V_{limit}$ depending on a response characteristic of the charger 13 against the charging current instruction value $I_{ins}$. In addition, the charging instruction unit 34 performs a charging control operation for stopping the charging if a predetermined charging stop condition is satisfied, that is, if the cell voltage $V_{cell}$ exceeds the protection voltage threshold $V_{prot}$ for the predetermined time $T_2$. As a result, it is possible to prevent overcharging in which the cell voltage $V_{cell}$ exceeds the charging limitation voltage $V_{limit}$. In addition, even when a response delay of the charging current occurs, the charging operation is continuously performed if the delay is within an allowable and desirable response characteristic range. Therefore, it is possible to reliably prevent the charging amount from being excessively restricted.

Fourth Embodiment

A fourth embodiment of the present invention will now be described. Note that like reference numerals denote like elements as in the second and third embodiments, and their description will not be repeated herein. In addition, according to the fourth embodiment, there is no need to provide the timer 32 in the secondary battery charger system 1.

According to the fourth embodiment, a variable charging target voltage $V_{target}'$ that changes depending on time after the cell voltage $V_{cell}$ reaches the charging target voltage $V_{target}$ (after the timing $t_1$) is set similar to the second embodiment. In addition, similarly, for the protection voltage threshold $V_{prot}$ described in the third embodiment, a variable protection voltage threshold $V_{prot}'$ that changes depending on time after the timing $t_1$ is set.

Here, the charging target setting unit 30 sets the variable protection voltage threshold $V_{prot}'$ to its maximum value, by which the cell voltage $V_{cell}$ can be maintained to be lower than the charging limitation voltage $V_{limit}$, on the basis of the measurement charging current $I_{mea}$, the cell temperature measured by the temperature sensor 17, the SOC measured by the SOC detection sensor 19, and the wear level detected by the wear level detection sensor 21 by considering a followability level [A/sec] of the charger 13. That is, the variable protection voltage threshold $V_{prot}'$ is higher than the protection voltage threshold $V_{prot}$. According to the fourth embodiment, the variable protection voltage threshold $V_{prot}'$ is set to be within a range between the variable charging target voltage $V_{target}'$ and the charging limitation voltage $V_{limit}$.

Specifically, an increase amount of the cell voltage $V_{cell}$ from the charging target voltage $V_{target}$ is estimated depending on the followability level of the charger 13 on the basis of the measurement charging current $I_{mea}$, the cell temperature, the SOC, and the wear level, and an upper limitation of the increase amount is set as the variable protection voltage threshold $V_{prot}'$.

Figure 8:
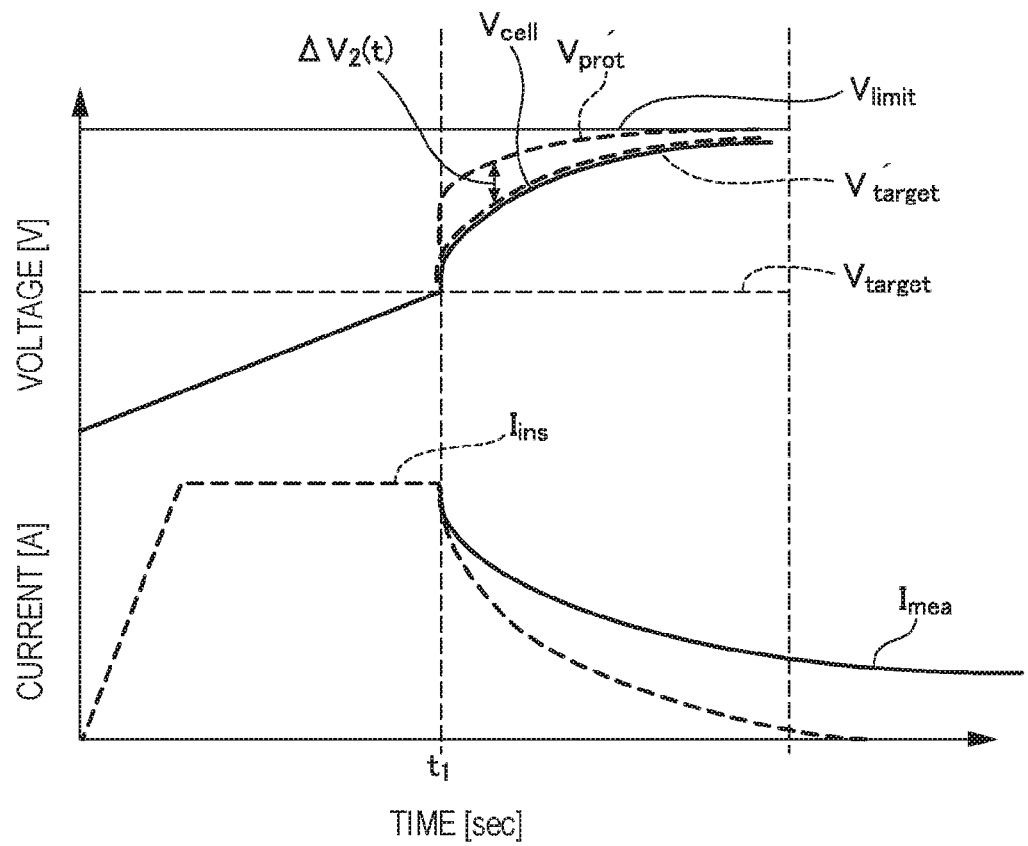
FIG. 8 is a diagram illustrating a charging control operation according to a fourth embodiment of the invention.

As illustrated in the FIG. 8, according to the fourth embodiment, the measurement charging current $I_{mea}$ is still large in the initial stage, and an increase amount of the cell voltage $V_{cell}$ per unit time caused by a diffusion resistance during charging increases after the end of the constant-current charging, that is, after the timing $t_1$. Therefore, an increase amount of the variable protection voltage threshold $V_{prot}'$ per unit time in the initial stage is also set to be relatively large.

Meanwhile, in the end stage after the timing $t_1$ (immediately before the end of the predetermined time $T_1$), the measurement charging current $I_{mea}$ is reduced, and the increase amount of the cell voltage $V_{cell}$ per unit time caused by a diffusion resistance during charging is reduced. Therefore, the increase amount of the variable protection voltage threshold $V_{prot}'$ per unit time in the initial stage is also set to be relatively small.

According to the fourth embodiment, the variable charging target voltage $V_{target}'$ is set to be lower than the variable protection voltage threshold $V_{prot}'$ by a correction value $\Delta V_2(t)$. As recognized from FIG. 8, the correction value $\Delta V_2(t)$ is a function that changes depending on time after the timing $t_1$, and its value is calculated on the basis of the temperature, the SOC, the measurement charging current $I_{mea}$, and the wear level of the secondary battery 10.

A specific calculation method for the variable charging target voltage $V_{target}'$ may be appropriately selected. In short, as the temperature of the secondary battery 10 and the SOC increase, the diffusion resistance increases, and the correction value $\Delta V_2(t)$ is reduced. Meanwhile, as the measurement charging current $I_{mea}$ of the secondary battery 10 and the wear level increase, the diffusion resistance increases, and the correction value $\Delta V_2(t)$ increases. Therefore, the variable charging target voltage $V_{target}'$ is determined by setting the correction value $\Delta V_2(t)$ on the basis of this tendency.

As described above, in the secondary battery charger system 1 according to the fourth embodiment, the charging threshold voltage setting unit 30 calculates the charging target voltage $V_{target}$ by subtracting the correction value $\Delta V_2(t)$ obtained on the basis of the temperature, the SOC, the charging current, and the wear level of the secondary battery 10 from the variable protection voltage threshold $V_{prot}'$.

As a result, it is possible to reliably prevent overcharging in which the cell voltage $V_{cell}$ exceeds the charging limitation voltage $V_{limit}$. In addition, it is possible to obtain a larger charging amount.

Although embodiments of this invention have been described hereinbefore, the aforementioned embodiments are just a part of applications of this invention, and are not intended to limit the technical scope of this invention to specific configurations of the aforementioned embodiments.

The invention claimed is:

1. A secondary battery charger system comprising:
   a controller programmed to:
      calculate a chargeable power on the basis of a difference between a charging target voltage and a cell voltage of the secondary battery; and
      calculate a charging current instruction value on the basis of the chargeable power;
   a charger configured to perform charging by supplying power on the basis of the chargeable power to the secondary battery on the basis of an instruction from the controller;
   a relay provided between the secondary battery and the charger,
      the controller further programmed to:
         set the charging target voltage to be lower than a charging limitation voltage that is an upper limitation of the cell voltage allowable in design;
         set an allowable voltage zone within a range higher than the charging target voltage and lower than the charging limitation voltage; and
         stop the charging by setting the charging current instruction value to zero if a charging stop condition is satisfied, the charging stop condition including a condition that the cell voltage continuously dwells in the allowable voltage zone for a predetermined time or longer.

2. The secondary battery charger system according to claim 1, wherein the controller is further programmed to:
   measure a time for which the cell voltage is maintained in the allowable voltage zone, wherein the allowable voltage zone is set as a voltage zone between the charging target voltage and the charging limitation voltage; and
   stop the charging if the measured time reaches a first predetermined time as the charging stop condition.

3. The secondary battery charger system according to claim 2, wherein the controller is further programmed to calculate the charging target voltage on the basis of at least one of a temperature, a state of charge (SOC), a charging current, and a wear level of the secondary battery.

4. The secondary battery charger system according to claim 1, wherein the controller is further programmed to:
   measure a time for which the cell voltage is maintained in the allowable voltage zone;
   set a protection voltage threshold higher than the charging target voltage and lower than the charging limitation voltage,
   wherein the allowable voltage zone is set to be higher than the protection voltage threshold and lower than the charging limitation voltage; and
   stop the charging if the measurement time reaches a second predetermined time as the charging stop condition.

5. The secondary battery charger system according to claim 4, wherein the controller is further programmed to:
   calculate the charging target voltage by subtracting a correction value obtained on the basis of at least one of a temperature, a state of charge (SOC), a charging current, and a wear level of the secondary battery from the protection voltage threshold.

6. The secondary battery charger system according to claim 1, wherein the controller is further programmed to:
   forcedly shut down a relay between the secondary battery and the charger when the cell voltage reaches the charging limitation voltage.

7. The secondary battery charger system according to claim 6, wherein the controller is further programmed to:
   record information on the charger as an unusable charger in the next charging if the relay is forcedly shut down.

8. The secondary battery charger system according to claim 7, wherein the information on the charger contains placement position information of the charger, and the placement position information of the charger is reflected on position information of a GPS system mounted to a power-consuming device or vehicle provided with the secondary battery.

9. A method of charging a secondary battery, comprising:

a charging control process of performing charging by calculating a chargeable power on the basis of a difference between a charging target voltage and a cell voltage of the secondary battery and supplying power on the basis of the chargeable power to the secondary battery, such that the cell voltage becomes equal to the charging target voltage when the charging is completed; and a charging target voltage setting process of setting the charging target voltage to be lower than a charging limitation voltage as an upper limitation of the cell voltage allowed in design, wherein, in the charging control process, an allowable voltage zone is set within a range higher than the charging target voltage and lower than the charging limitation voltage, and the charging stops by setting a charging current instruction value to zero if a charging stop condition is satisfied, the charging stop condition including a condition that the cell voltage continuously dwells in the allowable voltage zone for a predetermined time or longer.

\* \* \* \* \*